US009836926B1

(12) United States Patent
Higgins

(10) Patent No.: US 9,836,926 B1
(45) Date of Patent: Dec. 5, 2017

(54) CONTROLLER DOORBELL CIRCUIT AND METHODS OF CONVERTING A STANDARD DOORBELL CIRCUIT TO A CONTROLLER DOORBELL CIRCUIT

(71) Applicant: Scott Higgins, Gilbert, AZ (US)

(72) Inventor: Scott Higgins, Gilbert, AZ (US)

( * ) Notice: Subject to any disclaimer, the term of this patent is extended or adjusted under 35 U.S.C. 154(b) by 0 days.

(21) Appl. No.: 15/291,958

(22) Filed: Oct. 12, 2016

Related U.S. Application Data

(60) Provisional application No. 62/240,601, filed on Oct. 13, 2015.

(51) Int. Cl.
| | |
|---|---|
| *G08B 29/00* | (2006.01) |
| *G08B 3/10* | (2006.01) |
| *H04M 1/725* | (2006.01) |
| *G08B 29/18* | (2006.01) |
| *H04M 1/02* | (2006.01) |
| *H04M 11/02* | (2006.01) |

(52) U.S. Cl.
CPC ......... *G08B 3/1016* (2013.01); *G08B 29/181* (2013.01); *H04M 1/0291* (2013.01); *H04M 1/7253* (2013.01); *H04M 11/025* (2013.01)

(58) Field of Classification Search
CPC ...... G08B 3/1016; G08B 3/10; G08B 29/181; H04M 11/0025; H04M 1/0291; H04M 1/7253; H04M 11/025
USPC .......................................................... 340/509
See application file for complete search history.

(56) References Cited

U.S. PATENT DOCUMENTS

| | | | | |
|---|---|---|---|---|
| 6,185,294 | B1 * | 2/2001 | Chornenky | H04M 9/001 379/169 |
| 6,759,955 | B2 * | 7/2004 | Koneff | G08B 3/10 116/148 |
| 6,823,064 | B1 * | 11/2004 | Korman | H04Q 1/142 379/333 |
| 7,417,535 | B2 * | 8/2008 | Mathews | H04B 3/546 340/286.11 |
| 2008/0297339 | A1 * | 12/2008 | Mathews | H04L 12/10 340/538.16 |

\* cited by examiner

*Primary Examiner* — John A Tweel, Jr.
(74) *Attorney, Agent, or Firm* — Michael W. Goltry; Robert A. Parsons; Parsons & Goltry

(57) ABSTRACT

A controller doorbell circuit includes a first terminal of a button wired to a first terminal of a transformer, a second terminal of the transformer wired to an input transformer terminal of a controller wired to a battery power source and coupled in signal communication to a mobile device, a transformer terminal of a signaling device wired to an output transformer terminal of the controller, and a second terminal of the button and an alarm terminal of the signaling device wired to an alarm terminal of the controller. The controller opens disabling the controller doorbell circuit disabling the signaling device from sounding an alarm when the button is pressed, in response to a first signal from the mobile device. The controller closes enabling the controller doorbell circuit enabling the signaling device to sound the alarm when the button is pressed, in response to a second signal from the mobile device.

9 Claims, 13 Drawing Sheets

CONTROLLER DOORBELL CIRCUIT AND METHODS OF CONVERTING A STANDARD DOORBELL CIRCUIT TO A CONTROLLER DOORBELL CIRCUIT

CROSS-REFERENCE TO RELATED APPLICATION

This application claims the benefit of U.S. Provisional Patent Application No. 62/240,601, filed Oct. 13, 2015, the entire contents of which are incorporated herein by reference.

FIELD OF THE INVENTION

The present invention relates to doorbells and, more particularly, to methods of selectively enabling and disabling a doorbell remotely via a mobile device.

BACKGROUND OF THE INVENTION

A doorbell is a signaling device that sounds an alarm for alerting an occupant of a building, when a visitor presses a button near an entry door to the building. The alarm issued by the signaling device of a standard doorbell is sufficiently loud to ensure that an occupant of the building can be alerted to the presence of a visitor when the doorbell button is pressed.

A doorbell enables a visitor to alert one or more occupants of a building to their calling from an entry door. However, a sounding doorbell can awaken a sleeping occupant unwantedly, such as during standard sleeping hours or during a daytime nap. Children often nap during the day, and are frequently awakened by sounding doorbells. Although doorbells are important for alerting a building occupant to calling visitor, there is a need in the art for a doorbell that can be selectively silenced when desired, such during standard sleeping hours, during naps, and at other selected times when being disturbed by a sounding doorbell is unwanted.

SUMMARY OF THE INVENTION

According to the principle of the invention, a method of converting a doorbell circuit to a controller doorbell circuit includes providing a doorbell circuit including a doorbell button having a first terminal and a second terminal, a transformer having a first terminal and a second terminal, the first terminal of the doorbell button is wired to the first terminal of the transformer, the second terminal of the transformer is wired to a transformer terminal of the signaling device, the second terminal of the doorbell button is wired to an alarm terminal of the signaling device, the doorbell circuit is closed activating the signaling device, when the doorbell button is pressed, and the doorbell circuit is open deactivating the signaling device, when the doorbell button is released, and converting the doorbell circuit to a controller doorbell circuit by providing a controller wired to a battery power source, the controller being coupled in signal communication to a mobile device, dewiring the second terminal of the transformer from the transformer terminal of the signaling device, dewiring the second terminal of the doorbell button from the alarm terminal of the signaling device, wiring the second terminal of the transformer to an input transformer terminal of the controller, wiring the transformer terminal of the signaling device to an output transformer terminal of the controller, and wiring the second terminal of the doorbell button and the alarm terminal of the signaling device concurrently to an alarm terminal of the controller, wherein the controller opens disabling the controller doorbell circuit for disabling the signaling device from sounding an alarm when the doorbell button is pressed, in response to a first signal from the mobile device, wherein the controller closes enabling the controller doorbell circuit for enabling the signaling device to sound the alarm when the doorbell button is pressed, in response to a second signal from the mobile device, wherein the battery power source powers the controller, when the controller is open, and wherein the transformer powers the controller, when the controller is closed. The step of wiring the second terminal of the transformer to the input transformer terminal of the controller further includes wiring the second terminal of the transformer directly to the input transformer terminal. The step of wiring the transformer terminal of the signaling device to the output transformer terminal of the controller further includes wiring the transformer terminal of the signaling device directly to the output transformer terminal of the controller. The step of wiring the second terminal of the doorbell button and the alarm terminal of the signaling device concurrently to an alarm terminal of the controller further includes concurrently wiring the second terminal of the doorbell button and the alarm terminal of the signaling device directly to the alarm terminal of the controller.

According to the principle of the invention, a controller doorbell includes a controller doorbell circuit including a first terminal of a doorbell button wired to a first terminal of a transformer, a second terminal of the transformer wired to an input transformer terminal of a controller wired to a battery power source and coupled in signal communication to a mobile device, a transformer terminal of a signaling device wired to an output transformer terminal of the controller, and a second terminal of the doorbell button and an alarm terminal of the signaling device wired to an alarm terminal of the controller. The controller opens disabling the controller doorbell circuit for disabling the signaling device from sounding an alarm when the doorbell button is pressed, in response to a first signal from the mobile device, the controller closes enabling the controller doorbell circuit for enabling the signaling device to sound the alarm when the doorbell button is pressed, in response to a second signal from the mobile device, the battery power source powers the controller, when the controller is open, and the transformer powers the controller, when the controller is closed. The first terminal of the doorbell button is wired directly to the first terminal of a transformer. The second terminal of the transformer is wired directly to the input transformer terminal of the controller. The transformer terminal of the signaling device is wired directly to the output transformer terminal of the controller. The second terminal of the doorbell button and the alarm terminal of the signaling device are each wired directly to the alarm terminal of the controller.

Consistent with the foregoing summary of illustrative embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

A controller doorbell circuit and methods of converting a standard doorbell circuit to a controller doorbell circuit are disclosed.

Figure 1:
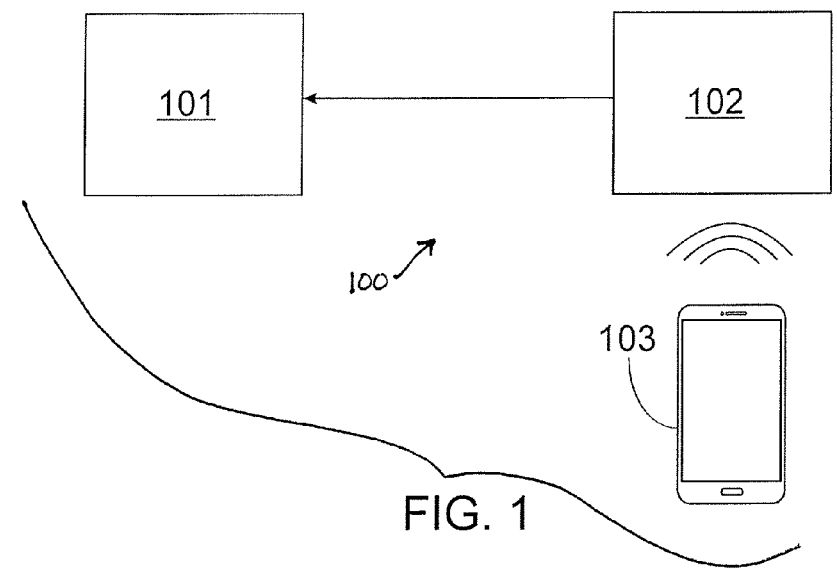
FIG. 1 is a highly generalized schematic representation of a controller doorbell constructed and arranged in accordance with the principle of the invention including a controller operatively coupled to a signaling device, and a mobile device coupled in signal communication to the controller, wherein the controller opens disabling the signaling device from sounding an alarm, in response to a first signal from the mobile device, and wherein the controller closes enabling the signaling device to sound the alarm, in response to a second signal from the mobile device.

Turning now to the drawings, in which like reference characters indicate corresponding elements throughout the several views, FIG. 1 is a highly generalized schematic representation of a controller doorbell 100 constructed and arranged in accordance with the principle of the invention. Controller doorbell 100 includes a signaling device 101, a controller 102 operatively coupled to signaling device 101, and a mobile device 103 coupled in signal communication to controller 21. Controller 102 opens disabling signaling device 101 from sounding an alarm, in response to a first signal from mobile device 103. Controller 102 closes enabling signaling device 101 to sound the alarm, in response to a second signal from mobile device 103.

The term "mobile device" means a small computing device, typically small enough to be handheld, having a touchscreen, a display screen with touch input, and a camera. Such exemplary and ubiquitous known mobile devices include smartphones or mobile phones with an advanced mobile operating system that combines features of a personal computer operating system with other features useful for mobile or handheld use. Such mobile devices are usually pocket-sized, include features of a cell phone, such as the ability to receive and make phone calls and text messages, are enabled to access the Internet, and include a graphical user interface in the nature of a touchscreen, a camera for taking videos and still pictures.

Mobile device 103 is coupled in signal communication wirelessly to controller 102 via a conventional wireless technology standard. The preferred wireless technology standard that wirelessly couples mobile device 103 in signal communication to controller 102 is Bluetooth. Other wireless technologies can be used to couple mobile device 103 in signal communication wirelessly to controller 102, such as radio frequency, Wi-Fi, or infrared, without departing from the invention.

Figure 2:
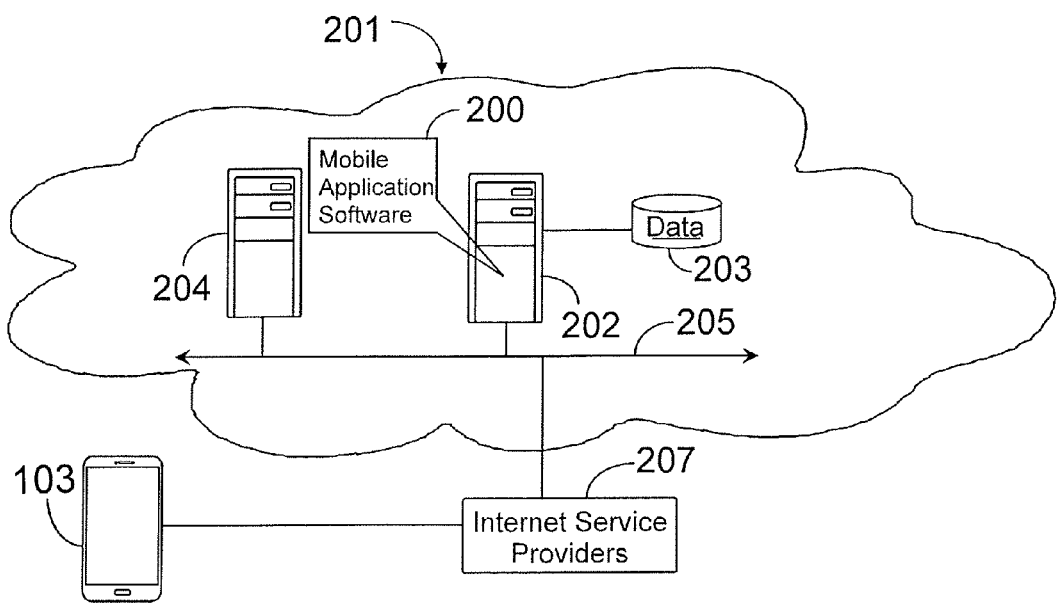
FIG. 2 is a schematic diagram of a mobile computer network system according to the principle of the invention.

FIG. 2 is a schematic diagram of a mobile computer network system 201 according to the principle of the invention, including Internet-connected server 202 executing mobile application software 200 from non-transitory media. Server 202 is connected to a data repository 203, which is a conventional data storage known in the art. System 201 further includes a third party Internet-connected server 204 connected to Internet backbone 205. Although one third party Internet-connected server 204 is shown, it is understood that potentially vast number of other similar servers are connected to the Internet via Internet backbone 205. Mobile device 103 is adapted to be connected to server 202 via an Internet service provider (ISP) 207, allowing a user to access software 200 via mobile device 103 and to download software 200 on mobile device 103 for use in accessing and controlling controller 102. Software 200 enables a user to access controller 102 via mobile device 103, and to employ mobile device 103 to open and close controller 102. Software 200 provides a plurality of controls when executed by mobile device 103, allowing the user to manually open and close controller 102 via mobile device 103, such as at the press of a button, or to schedule controller 102 via mobile device 103 to be opened or closed at preselected times throughout a given day.

Figure 3:
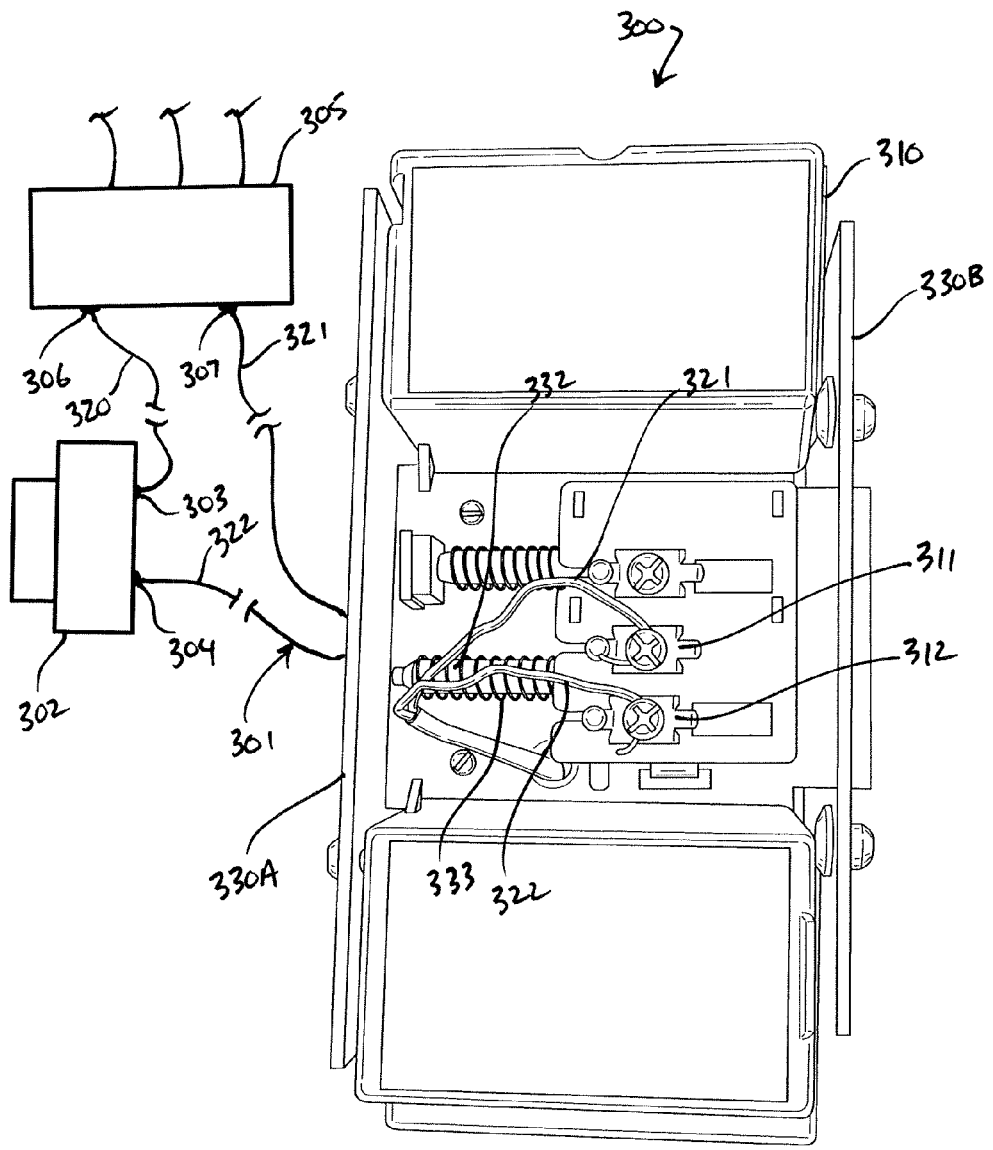
FIGS. 3-14 illustrate a sequence of steps of converting a standard, prior art doorbell circuit of a standard, prior art doorbell in FIG. 3, to a controller doorbell circuit of a controller doorbell of FIG. 14 in accordance with the principle of the invention.
Figure 10:
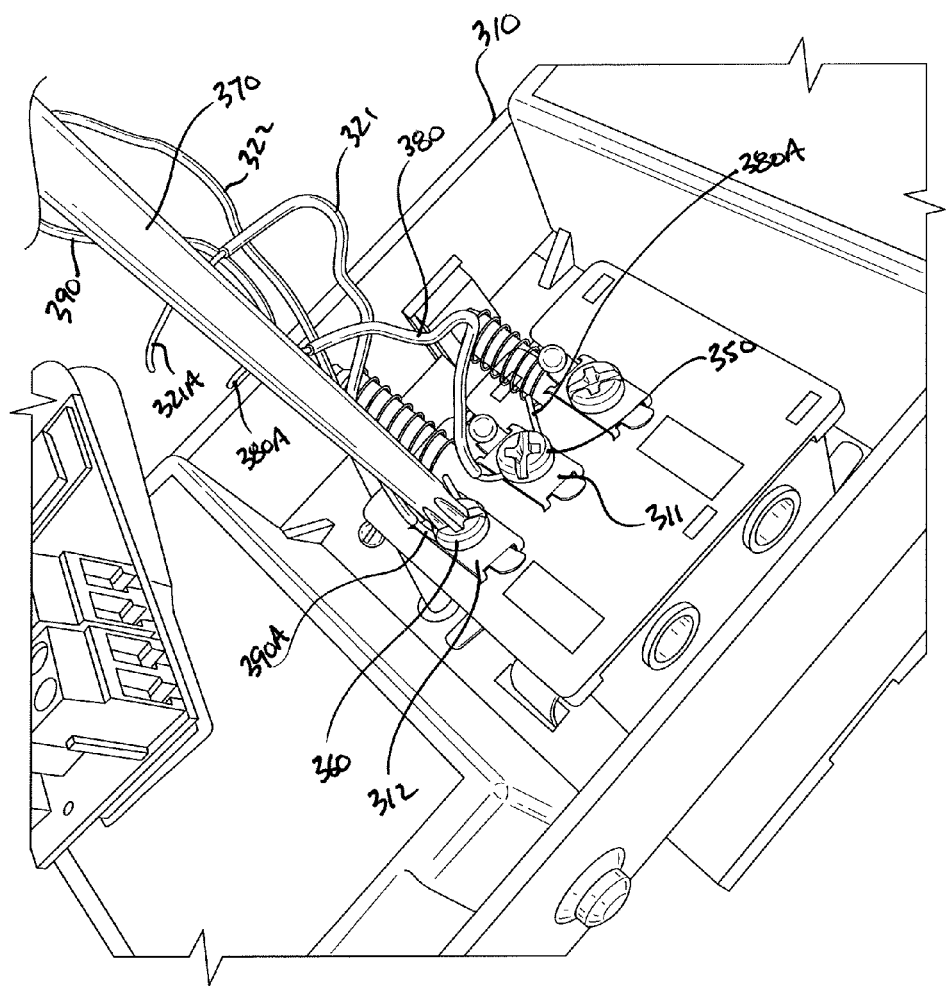
Figure 11:
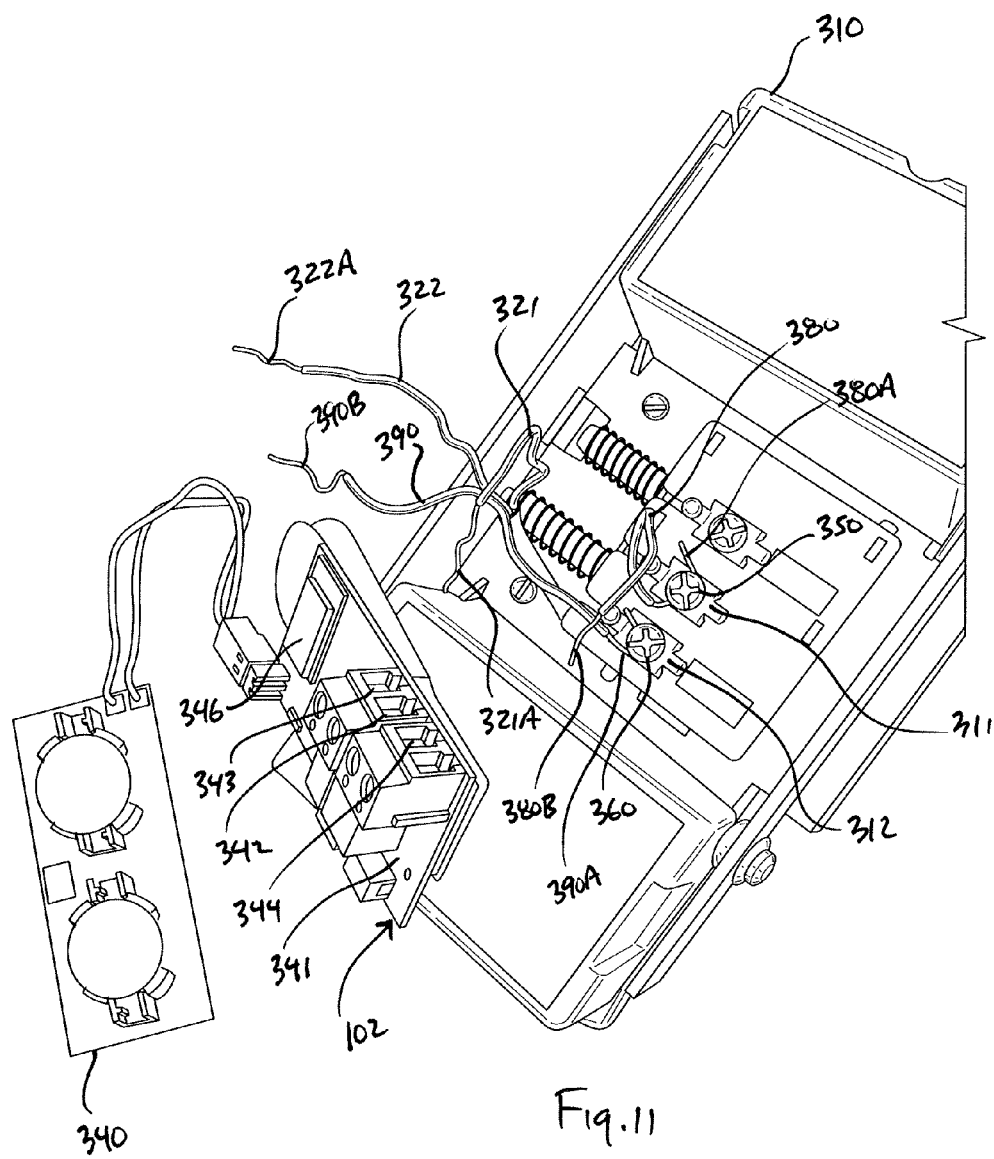
Figure 12:
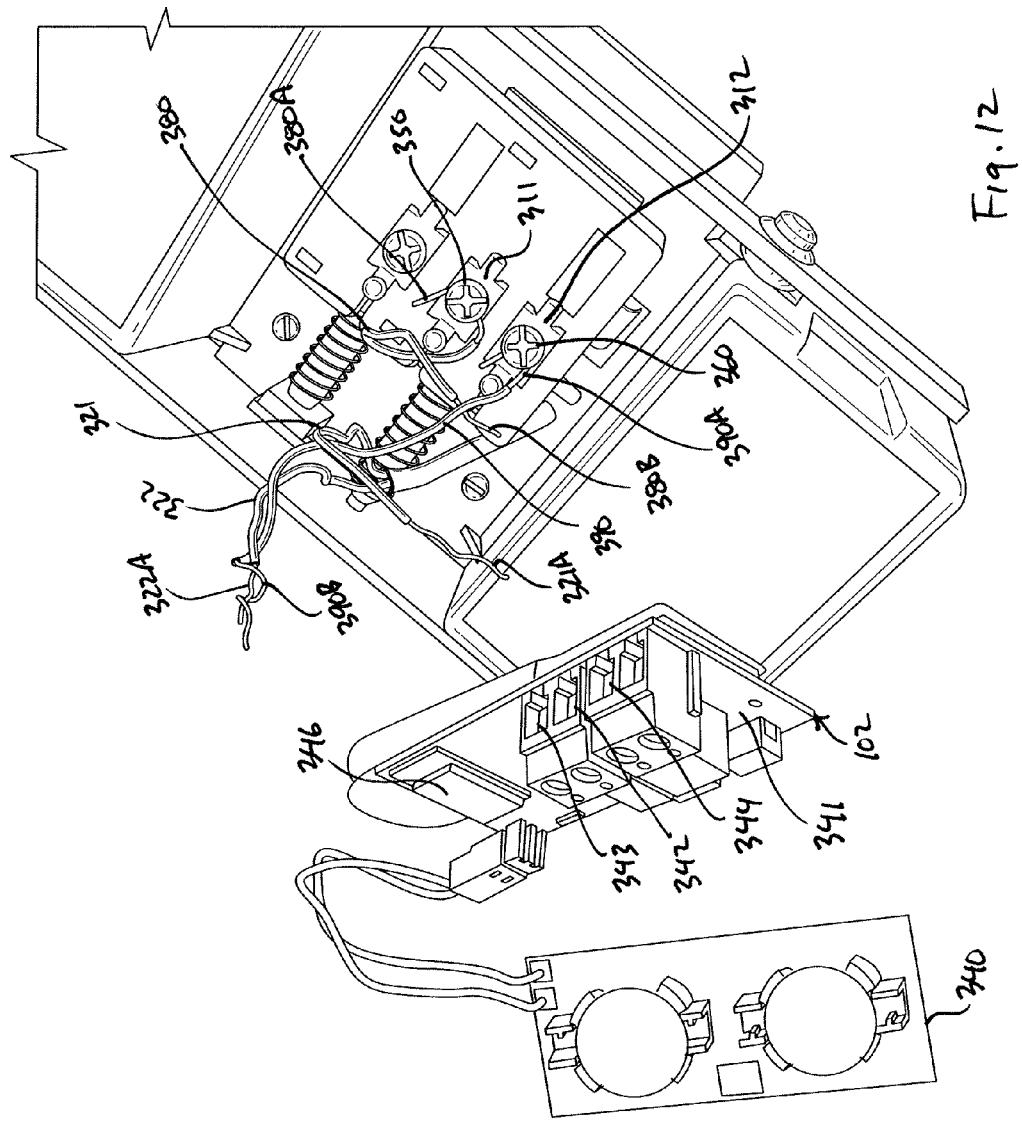
Figure 13:
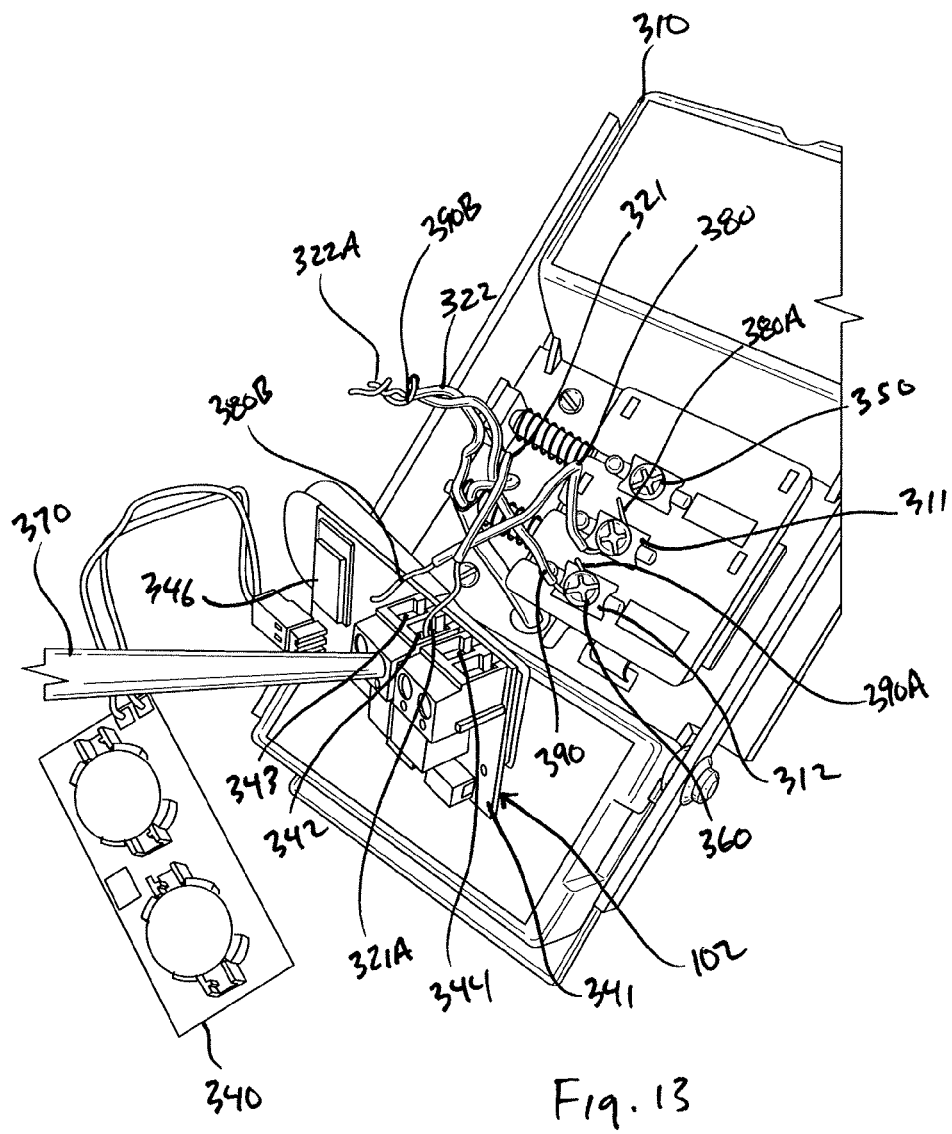
Figure 14:
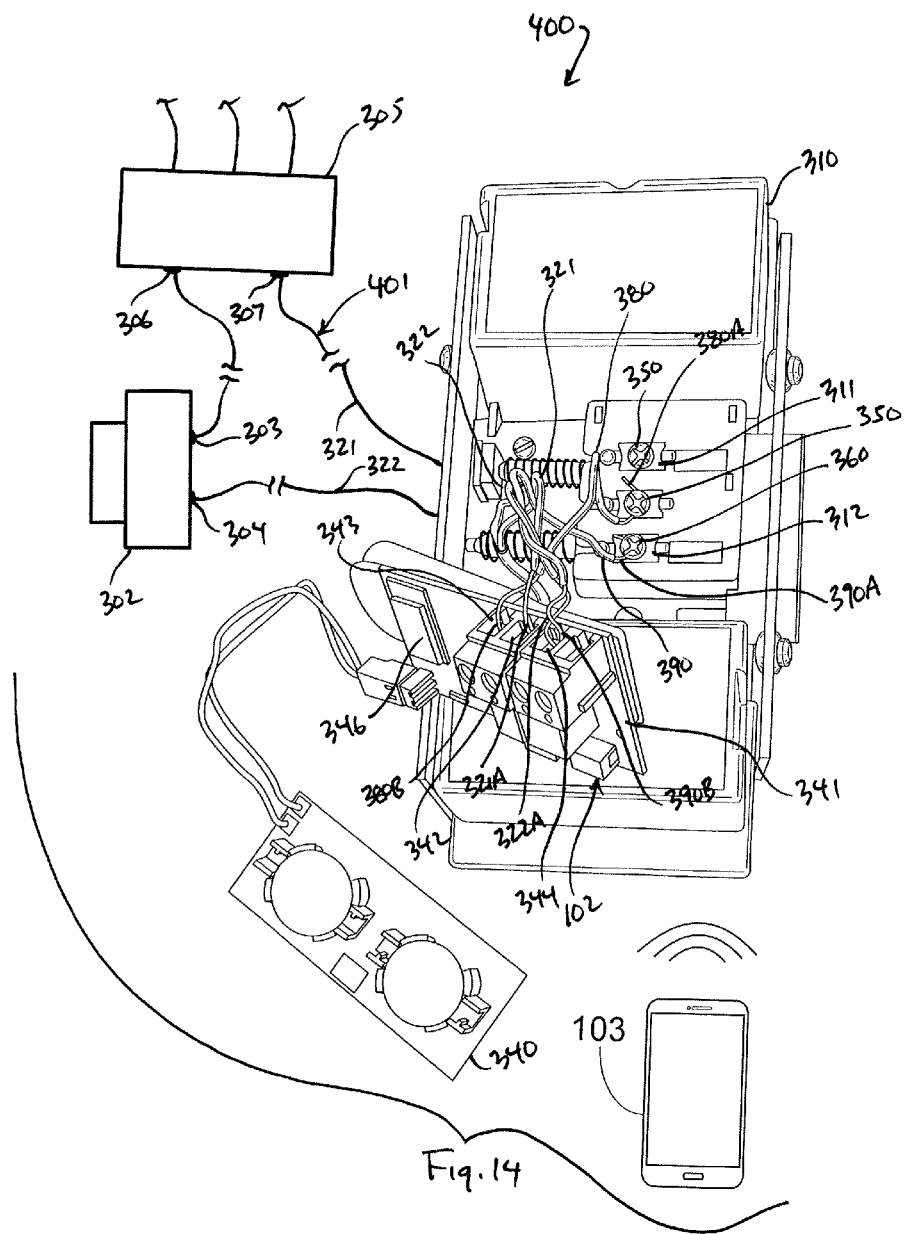

FIGS. 3-14 illustrate a sequence of steps of converting a standard, prior art doorbell circuit 301 of a standard, prior art doorbell 300 in FIG. 3, to a controller doorbell circuit 401 of a controller doorbell 400 in FIG. 14 in accordance with the principle of the invention. The method of converting doorbell 300 of FIG. 3 to controller doorbell 400 of FIG. 14, namely, converting doorbell circuit 301 of FIG. 3 to controller doorbell circuit 401 of FIG. 14, initially begins by providing standard, prior art doorbell circuit 301 of standard, prior art doorbell 300, and, according to the principle of the invention, controller 102. In FIG. 12, controller 102 is wired to battery power source 340 and includes printed circuit board 341 that mechanically supports and electrically connects input transformer terminal 342, output transformer terminal 343, alarm terminal 344, and switch 346. In FIG. 3, doorbell circuit 301 is a standard, prior art, one-button doorbell circuit 301, including a doorbell button 302 having first terminal 303 and second terminal 304, a transformer 305 having first terminal 306 and second terminal 307, and signaling device 310 having transformer terminal 311 and alarm terminal 312. First terminal 303 of button 302 is wired to first terminal 306 of transformer 305 via wire 320, second terminal 307 of transformer 305 is wired to transformer terminal 311 of signaling device 310 via wire 321, and second terminal 304 of button 302 is wired to alarm terminal 312 of signaling device 310 via wire 322. Wire 320 wires first terminal 303 of button 302 directly to first terminal 306 of transformer 305, wire 321 wires second terminal 307 of transformer 305 directly to transformer terminal 311 of signaling device 310, and wire 322 wires second terminal 304 of button 302 directly to alarm terminal 312 of signaling device 310. Doorbell circuit 301 is closed activating signaling device 310, when button 302 is pressed. Doorbell circuit 301 is open deactivating signaling device 310, when button 302 is released. Button 302 is a standard, single-pole, single-through pushbutton switch that momentarily closes doorbell circuit 301 when button 302 is pressed. Transformer 305 steps down the 120 or 240-volt AC electrical power from the building's AC mains input to a lower voltage, typically 10 to 20 volts, which is supplied to signaling device 310.

Signaling device 310 sounds an audible alarm when button 302 is pressed. Button 302 is mounted exteriorly near an entry door to the building, which is a house, an apartment, or other chosen building. Signaling device 310, which is a standard chime, a standard bell, or a standard buzzer, is mounted inside the building. The audible alarm sounded by signaling device 310 is a sound of one or more musical notes, when signaling device 310 is a chime. The audible alarm sounded by signaling device 310 is a sound of one or more ringing bells, when signaling device 310 is a bell. The audible alarm sounded by signaling device 310 is a buzzing sound, when signaling device 310 is a buzzer. The audible alarm issued by signaling device 310 is sufficiently loud to ensure that one or more occupants of the building are alerted to the presence of a calling visitor at the entry door when button 302 is pressed. In this example, signaling device 310 is a standard chime, including two flat metal bar resonators 330, which are struck by plunger 332 operated by a solenoid. Resonators 330 are tuned to selected notes. When button 302 is pressed closing doorbell circuit 301, the solenoid of signaling device 310 actuates plunger 332, which strikes one of resonators 330, such as resonator 330A. When button 302 is released opening doorbell circuit 301, a spring 333 on plunger 332 pushes plunger 332 in the opposite direction, causing it to strike the other one of the resonators 330, namely, resonator 330B. This creates a standard two-tone or "ding-dong" sound.

Figure 4:
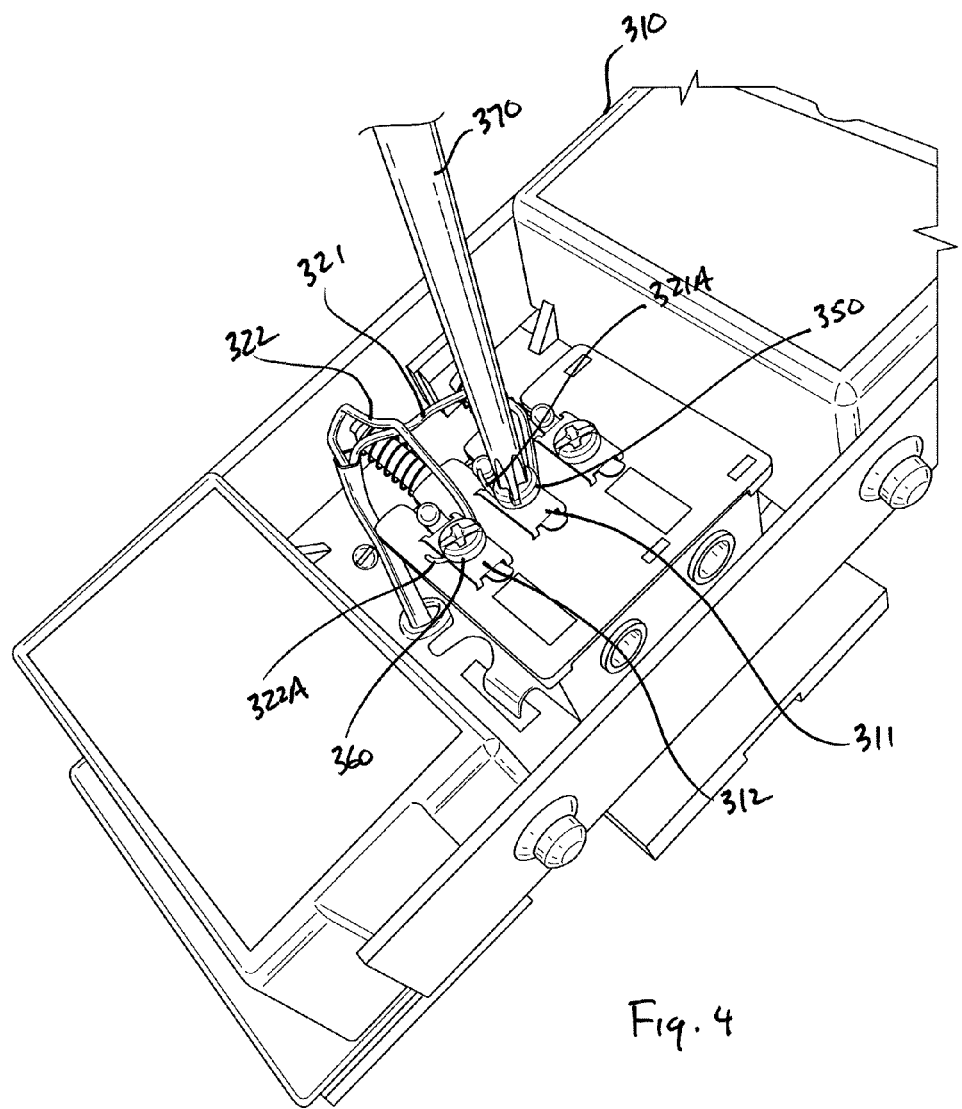
Figure 5:
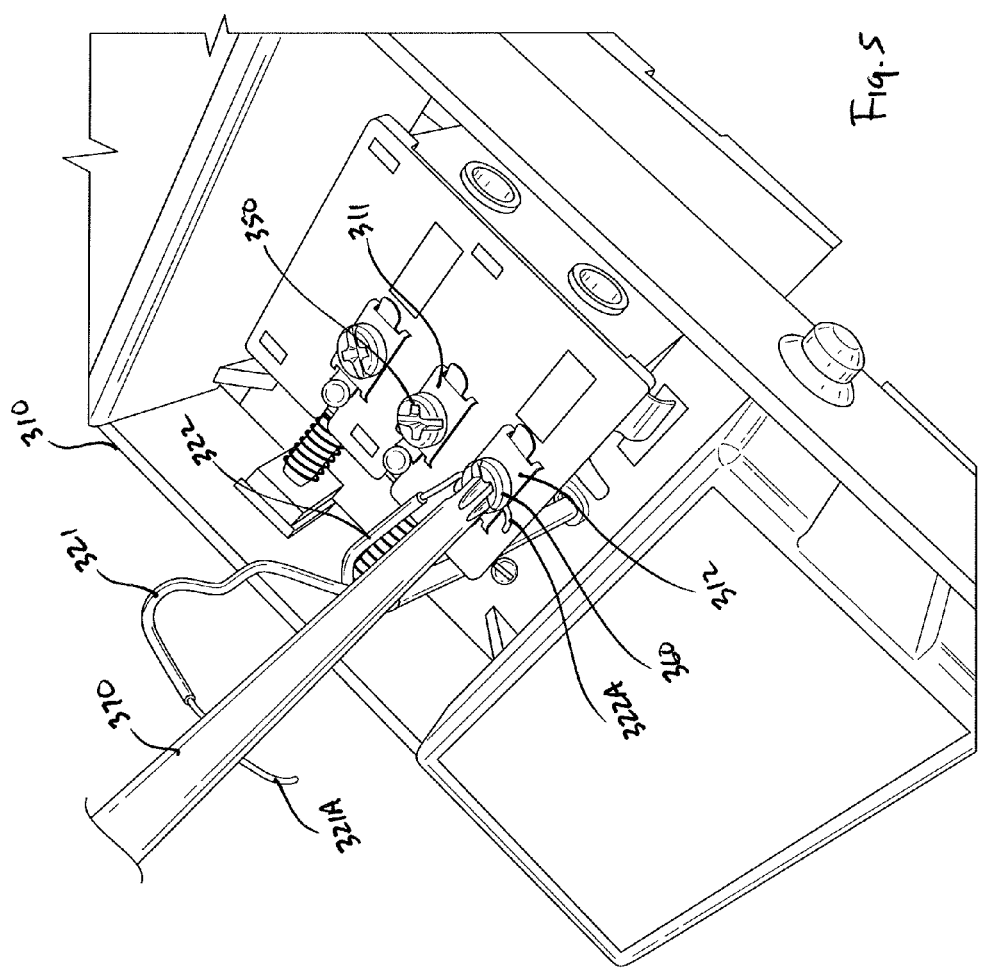
Figure 6:
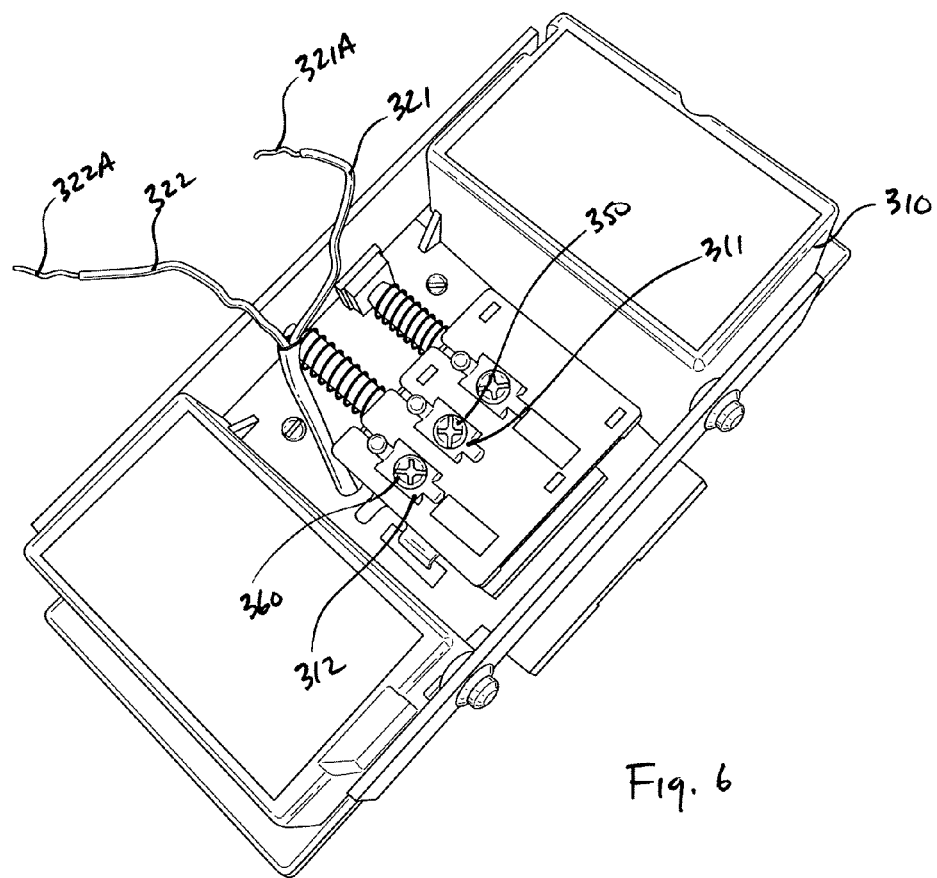
Figure 7:
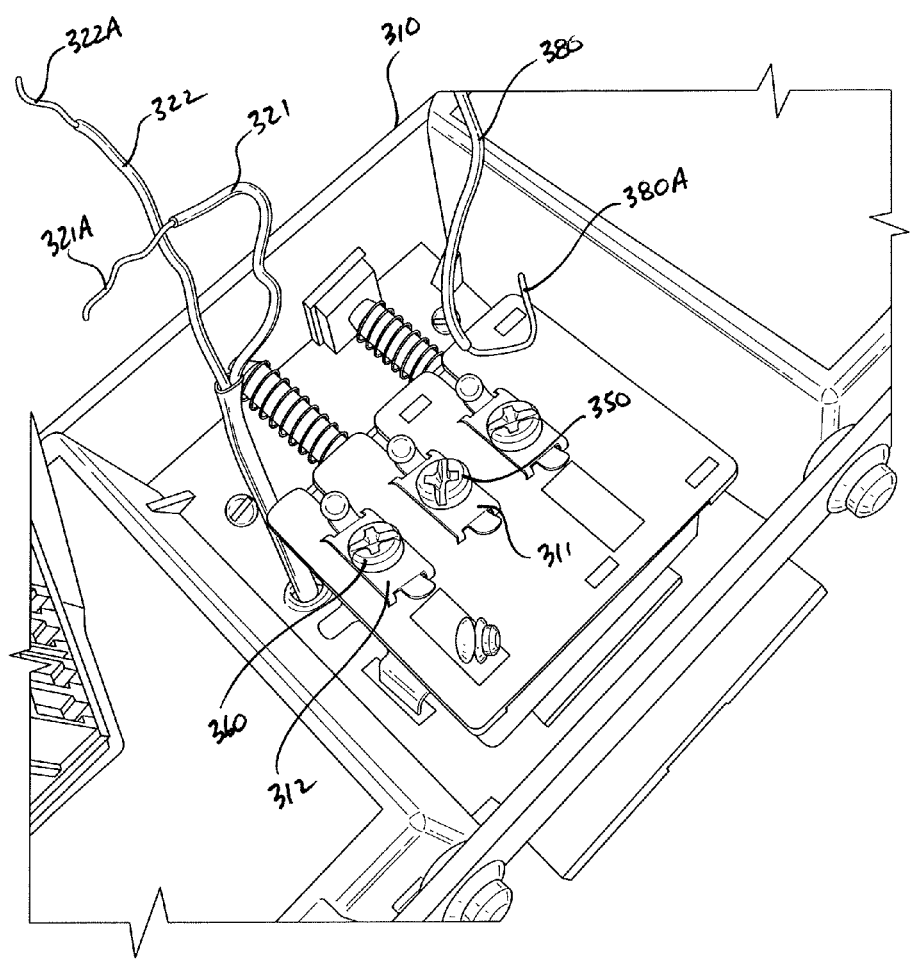

According to the principle of the invention, converting doorbell circuit 301 to controller doorbell circuit 401 includes dewiring second terminal 307 of transformer 305 from transformer terminal 311 of signaling device 310 in FIGS. 4 and 5, dewiring second terminal 304 of button 302 from alarm terminal 312 of signaling device 310 in FIGS. 6 and 7, and in FIGS. 8-14 wiring second terminal 307 of transformer 305 to input transformer terminal 342 of controller 102, wiring transformer terminal 311 of signaling device 310 to output transformer terminal 343 of controller 102, and wiring second terminal 304 of button 302 and alarm terminal 312 of signaling device 310 concurrently to alarm terminal 344 of controller 102 forming controller doorbell circuit 401 in FIG. 14, wherein controller 102 opens by opening switch 346 opening and thereby disabling controller doorbell circuit 401 for disabling signaling device 310 from sounding its alarm when button 302 is pressed, in response to a first signal from mobile device 103, wherein controller closes by closing switch 346 closing and thereby enabling controller doorbell circuit 401 for enabling signaling device 310 to sound its alarm when button 302 is pressed, in response to a second signal from mobile device 103, wherein battery power source 340 powers controller 102, when controller 102 is open, i.e. when switch 346 is open, and wherein transformer 305 powers controller 102, when controller 102 is closed, i.e., when switch 346 is closed. Wiring second terminal 307 of transformer 305 to input transformer terminal 342 of controller 102 more specifically includes wiring second terminal 307 of transformer 305 directly to input transformer terminal 342 of controller 102. Wiring transformer terminal 311 of signaling device 310 to output transformer terminal 343 of controller 102 more specifically includes wiring transformer terminal 311 of signaling device 310 directly to output transformer terminal 343 of controller 102. Wiring second terminal 304 of button 302 and alarm terminal 312 of signaling device 310 concurrently to alarm terminal 344 of controller 102 more specifically includes concurrently wiring second terminal 304 of button 302 and alarm terminal 312 of signaling device 310 directly to alarm terminal 344 of controller 102.

In FIG. 4, terminal end 321A of wire 321 is secured releasably to transformer terminal 311 via standard, Phillips head screw 350, and terminal end 322A of wire 322 is secured releasably to alarm terminal 312 via standard, Phillips head screw 360. The step of dewiring second terminal 307 of transformer 305 from transformer terminal 311 of signaling device 310 in FIGS. 4 and 5 includes loosening screw 350 in FIG. 4 with standard Phillips head screwdriver 370 and releasing terminal end 321A from transformer terminal 311 in FIG. 5, and step of dewiring second terminal 304 of button 302 from alarm terminal 312 of signaling device 310 in FIGS. 4 and 5 includes loosening screw 360 in FIG. 5 with screwdriver 370 and releasing terminal end 322A from alarm terminal 312 in FIG. 6. At this stage, terminal ends 321A and 322A of the respective wires 321 and 322 are detached from the respective transformer and alarm terminals 311 and 312.

The step of wiring second terminal 307 of transformer 305 to input transformer terminal 342 of controller 102 includes electrically connecting terminal end 321A of wire 321 to input transformer terminal 342 by inserting terminal end 321A of wire 321 into input transformer terminal 342 and tightening down input transformer terminal 342 against terminal end 321A of wire 321 with screwdriver 370 in FIG. 13, all without dewiring wire 321 from second terminal 307 of transformer 305. Second terminal 307 of transformer is wired directly to input transformer terminal 342 with wire 321.

Figure 8:
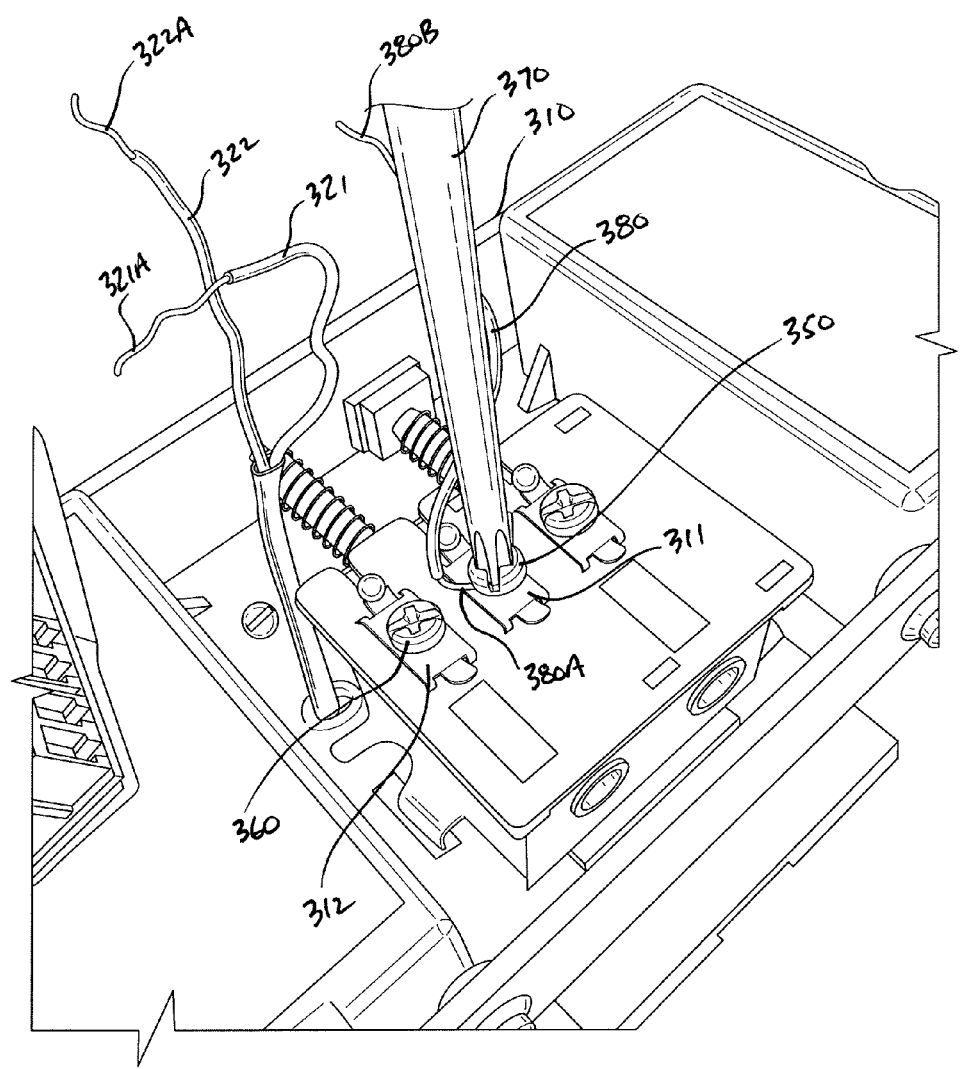
Figure 9:
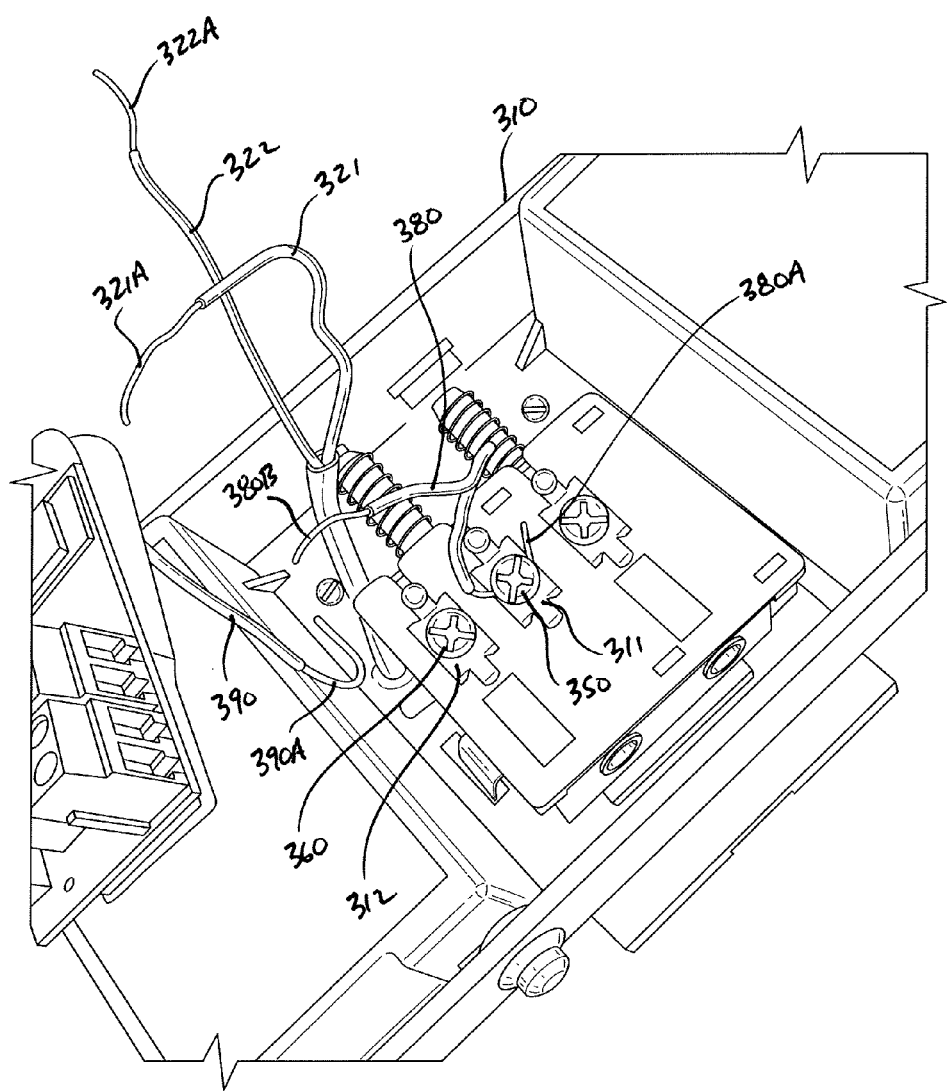

The step of wiring transformer terminal 311 of signaling device 310 to output transformer terminal 343 of controller 102 includes providing connecting wire 380 in FIGS. 7 and 8 having terminal end 380A and opposed terminal end 380B in FIG. 9, electrically connecting terminal end 380A of wire 380 to transformer terminal 311 of signaling device 310 by positioning terminal end 380A between loosened screw 350 and transformer terminal 311 and tightening down screw 350 with screwdriver 370 clamping down terminal end 321A of wire 321 against transformer terminal 311 in FIG. 7, and electrically connecting terminal end 380B of wire 380 to output transformer terminal 343 by inserting terminal end 380B of wire 380 into output transformer terminal 343 and tightening down output transformer terminal 343, identically to that of input transformer terminal 342, against terminal end 380B of wire 380 in FIG. 14. Transformer terminal 311 of signaling device 310 is wired directly to output transformer terminal 343 with wire 380.

The step of wiring second terminal 304 of button 302 and alarm terminal 312 of signaling device 310 concurrently to alarm terminal 344 of controller 102 completing the formation of controller doorbell circuit 401 of a controller doorbell 400 in FIG. 14 includes providing connecting wire 390 in FIGS. 9-11 having terminal end 390A and opposed terminal end 390B in FIGS. 10 and 11, electrically connecting terminal end 390A of wire 390 to alarm terminal 312 of signaling device 310 by positioning terminal end 390A between loosened screw 360 and alarm terminal 312 and tightening down screw 360 with screwdriver 370 in FIG. 10 clamping down terminal end 390A of wire 390 against alarm terminal 312 in FIG. 11, electrically connecting terminal end 390B of wire 390 to terminal end 322A of wire 322 by twisting terminal ends 390B and 322A together in FIGS. 12-14, such as by hand or with the aid of an instrument or tool, and electrically connecting twisted terminal ends 322A and 390B to alarm terminal 344 of controller 102 in FIG. 14 by inserting twisted terminal ends 322A and 390B into alarm terminal 344 concurrently and tightening down alarm terminal 344, identically to that of input transformer terminal 342, against twisted terminal ends 322A and 390B in FIG. 14, all without dewiring wire 322 from second terminal 304 of button 302. Second terminal 304 of button 302 is wired directly to alarm terminal 344 of controller 102 with wire 322, alarm terminal 312 of signaling device 310 is wired directly to alarm terminal 344 of controller 102, and wire 322 is wired directly to wire 39.

In FIG. 14, controller doorbell 400 includes controller doorbell circuit 401 including first terminal 303 of button 302 wired to first terminal 306 of transformer 305, second terminal 307 of transformer 305 wired to input transformer terminal 342 of controller 102 that is wired to battery power source 340 and that is coupled in signal communication to mobile device 103, transformer terminal 311 of signaling device 310 wired to output transformer terminal 343 of controller 102, and second terminal 304 of button 302 and alarm terminal 312 of signaling device 310 are wired to alarm terminal 344 of controller 102. First terminal 303 of button 302 wired directly to first terminal 306 of transformer 305, second terminal 307 of transformer 305 wired directly to input transformer terminal 342 of controller 102, transformer terminal 311 of signaling device 310 wired directly to output transformer terminal 343 of controller 102, and second terminal 304 of button 302 and alarm terminal 312 of signaling device 310 are wired directly to one another and directly to alarm terminal 344 of controller 102.

In controller doorbell 400, controller 102 opens by opening switch 346 opening and thereby disabling controller doorbell circuit 401 disabling signaling device 310 from sounding its alarm when button 302 is pressed, in response to a first signal from mobile device 103. Controller 102 closes by opening switch 346 closing and thereby enabling controller doorbell circuit 401 enabling signaling device 310 for sounding its alarm when button 302 is pressed, in response to a second signal from mobile device 103. Accordingly, in controller doorbell 400 a user may selectively open and close controller 102 wirelessly via mobile device 103 for selectively disabling signaling 310 from sounding its alarm when button 302 is pressed, such as during standard sleeping hours, during naps, and at other selected times when being disturbed by sounding signaling device 310 is unwanted, and for selectively enabling signaling device 310 to sound its alarm when button 302 is pressed. The conversion of doorbell 300 to controller doorbell 400 is carried out without altering or otherwise modifying button 302 and transformer 305, without altering or otherwise modifying the wiring of button 302 to transformer 305, and without changing wires 321 and 322, in accordance with the invention. After converting the standard doorbell circuit to the controller doorbell circuit according to the invention, signaling device 310, controller 102, and battery power source 340 can be packed into a protective housing or into a wall inside the building.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of converting a doorbell circuit to a controller doorbell circuit, comprising:
   providing a doorbell circuit, including a doorbell button having a first terminal and a second terminal, a transformer having a first terminal and a second terminal, the first terminal of the doorbell button is wired to the first terminal of the transformer, the second terminal of the transformer is wired to a transformer terminal of the signaling device, the second terminal of the doorbell button is wired to an alarm terminal of the signaling device, the doorbell circuit is closed activating the signaling device, when the doorbell button is pressed, and the doorbell circuit is open deactivating the signaling device, when the doorbell button is released;
   converting the doorbell circuit to a controller doorbell circuit by providing a controller wired to a battery power source, the controller being coupled in signal communication to a mobile device, dewiring the second terminal of the transformer from the transformer terminal of the signaling device, dewiring the second terminal of the doorbell button from the alarm terminal of the signaling device, wiring the second terminal of the transformer to an input transformer terminal of the controller, wiring the transformer terminal of the signaling device to an output transformer terminal of the controller, and wiring the second terminal of the doorbell button and the alarm terminal of the signaling device concurrently to an alarm terminal of the controller;
   wherein the controller opens disabling the controller doorbell circuit for disabling the signaling device from sounding an alarm when the doorbell button is pressed, in response to a first signal from the mobile device;
   wherein the controller closes enabling the controller doorbell circuit for enabling the signaling device to sound the alarm when the doorbell button is pressed, in response to a second signal from the mobile device;
   wherein the battery power source powers the controller, when the controller is open; and
   wherein the transformer powers the controller, when the controller is closed.

2. The method according to claim 1, wherein the step of wiring the second terminal of the transformer to the input transformer terminal of the controller further includes wiring the second terminal of the transformer directly to the input transformer terminal.

3. The method according to claim 2, wherein the step of wiring the transformer terminal of the signaling device to the output transformer terminal of the controller further includes wiring the transformer terminal of the signaling device directly to the output transformer terminal of the controller.

4. The method according to claim 3, wherein the step of wiring the second terminal of the doorbell button and the alarm terminal of the signaling device concurrently to an alarm terminal of the controller further includes concurrently wiring the second terminal of the doorbell button and the alarm terminal of the signaling device directly to the alarm terminal of the controller.

5. A controller doorbell, comprising:
   a controller doorbell circuit including a first terminal of a doorbell button wired to a first terminal of a transformer, a second terminal of the transformer wired to an input transformer terminal of a controller wired to a battery power source and coupled in signal communication to a mobile device, a transformer terminal of a signaling device wired to an output transformer terminal of the controller, and a second terminal of the doorbell button and an alarm terminal of the signaling device wired to an alarm terminal of the controller;
   the controller opens disabling the controller doorbell circuit for disabling the signaling device from sounding an alarm when the doorbell button is pressed, in response to a first signal from the mobile device;
   the controller closes enabling the controller doorbell circuit for enabling the signaling device to sound the alarm when the doorbell button is pressed, in response to a second signal from the mobile device;
   the battery power source powers the controller, when the controller is open; and
   the transformer powers the controller, when the controller is closed.

6. The controller doorbell according to claim 5, wherein the first terminal of the doorbell button is wired directly to the first terminal of a transformer.

7. The controller doorbell according to claim 6, wherein the second terminal of the transformer is wired directly to the input transformer terminal of the controller.

8. The controller doorbell according to claim 7, wherein the transformer terminal of the signaling device is wired directly to the output transformer terminal of the controller.

9. The controller doorbell according to claim 8, wherein the second terminal of the doorbell button and the alarm terminal of the signaling device are each wired directly to the alarm terminal of the controller.

* * * * *